(12) United States Patent
Wagadarikar et al.

(10) Patent No.: US 8,809,793 B2
(45) Date of Patent: Aug. 19, 2014

(54) SYSTEM AND METHOD FOR PIXELATED DETECTOR CALIBRATION

(75) Inventors: Ashwin Ashok Wagadarikar, Clifton Park, NY (US); Ravindra Mohan Manjeshwar, Glenville, NY (US); Sergei Ivanovich Dolinsky, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 383 days.

(21) Appl. No.: 13/360,381

(22) Filed: Jan. 27, 2012

(65) Prior Publication Data

US 2013/0193330 A1 Aug. 1, 2013

(51) Int. Cl.
G01T 1/166 (2006.01)

(52) U.S. Cl.
USPC ................... 250/363.04; 250/362

(58) Field of Classification Search
CPC ...................................... G01T 1/2985
USPC ............................ 250/362, 363.04
See application file for complete search history.

(56) References Cited

U.S. PATENT DOCUMENTS

| | | | |
|---|---|---|---|
| 5,319,204 A * | 6/1994 | Wong | 250/363.03 |
| 6,087,663 A * | 7/2000 | Moisan et al. | 250/367 |
| 6,624,422 B2 * | 9/2003 | Williams et al. | 250/363.09 |
| 7,026,621 B2 * | 4/2006 | Stonger et al. | 250/363.03 |
| 7,102,135 B2 * | 9/2006 | Lecoq | 250/363.03 |
| 7,129,495 B2 | 10/2006 | Williams et al. | |
| 7,554,089 B2 * | 6/2009 | Burr et al. | 250/366 |
| 7,718,954 B2 | 5/2010 | Wang et al. | |
| 7,750,311 B2 | 7/2010 | Daghighian | |
| 2006/0102845 A1 | 5/2006 | Williams et al. | |
| 2007/0176087 A1 | 8/2007 | Wang et al. | |
| 2008/0230704 A1 | 9/2008 | Daghighian | |
| 2008/0290282 A1 | 11/2008 | Zhang et al. | |
| 2010/0012846 A1 * | 1/2010 | Wang | 250/362 |

(Continued)

FOREIGN PATENT DOCUMENTS

| | | |
|---|---|---|
| CN | 101884087 | 11/2010 |
| WO | 2009031074 A2 | 3/2009 |
| WO | 2009031074 A3 | 3/2009 |

OTHER PUBLICATIONS

Deng et al., "Optimization and Calibration of Slat Position for a SPECT with Slit-Slat Collimator and Pixelated Detector Crystals", Nuclear Science, IEEE Transactions, (Oct. 2011) vol. 58, Issue 5, pp. 2234-2243, ISSN: 0018-9499, INSPEC Accerssion No. 12288035.

*Primary Examiner* — Christine Sung
(74) *Attorney, Agent, or Firm* — Fletcher Yoder, P.C.

(57) ABSTRACT

Present embodiments relate to the calibration of detectors having one or more arrays of pixelated detectors. According to an embodiment, a method includes detecting optical outputs generated by a plurality of scintillation crystals of a detector with an array of pixelated detectors, generating, with the array of pixelated detectors, respective signals indicative of the optical outputs, generating, from the respective signals, a unique energy spectrum correlated to each of the plurality of scintillation crystals, grouping subsets of the plurality of scintillation crystals into macrocrystals, determining a representative energy spectrum peak for each macrocrystal based on the respective energy spectra of the scintillation crystals in the macrocrystal, comparing a value of the representative energy spectrum peak for each macrocrystal with a target peak value, and adjusting an operating parameter of at least one pixelated detector in the array of pixelated detectors as a result of the comparison.

25 Claims, 9 Drawing Sheets

(56) References Cited

U.S. PATENT DOCUMENTS

| | | |
|---|---|---|
| 2010/0038546 A1* | 2/2010 | Schulz .......................... 250/362 |
| 2010/0084559 A1* | 4/2010 | Aykac et al. .................. 250/362 |
| 2010/0108900 A1 | 5/2010 | Burr et al. |
| 2010/0200763 A1 | 8/2010 | Thon et al. |
| 2010/0219346 A1 | 9/2010 | Daghighian |
| 2010/0327168 A1* | 12/2010 | Yamada et al. ............... 250/362 |
| 2011/0101227 A1* | 5/2011 | Tseng et al. .................. 250/362 |
| 2011/0210255 A1 | 9/2011 | Kim et al. |
| 2012/0212355 A1* | 8/2012 | Zhang et al. ..................... 341/50 |
| 2013/0056639 A1* | 3/2013 | Aykac et al. .................. 250/362 |
| 2014/0021354 A1* | 1/2014 | Gagon et al. .................. 250/362 |
| 2014/0042326 A1* | 2/2014 | Miyaoka et al. .............. 250/362 |

\* cited by examiner

SYSTEM AND METHOD FOR PIXELATED DETECTOR CALIBRATION

BACKGROUND

A wide range of imaging techniques are known and currently in use, particularly for medical diagnostic applications. Certain of these techniques, commonly referred to as nuclear imaging, rely on the detection of gamma rays during the radioactive decay of a radioisotope (or radionuclide), commonly administered in the form of a radiopharmaceutical agent that can be carried, and in some cases, bound to particular tissues of interest. A gamma ray detector detects the emissions via a gamma camera that typically includes a collimator, a scintillator, an array of pixelated photodetectors (such as photomultiplier tubes, avalanche photodiodes etc.) with individual gain adjustment capability, and, in some configurations, a light guide optically coupling the scintillators with the pixelated photodetector array. The collimator allows only emissions in a particular direction to enter into the scintillator. The scintillator converts the gamma radiation into lower energy ultraviolet photons that impact regions (pixels) of the pixelated detectors. These, in turn, generate image data related to the quantity of radiation impacting the individual regions. Image reconstruction techniques, such as back projection, may then be used to construct images of internal structures of the subject based upon this image data.

Pixelated detectors within the detector may include photodiodes. The photodiodes produce an output pulse that is proportional to the number of photons incident on a surface of the pixelated detector. One challenge in the use of such configurations is that the light yield across different scintillators may vary, and the operating parameters of the pixelated detectors may also vary. These differences and variations may result in difficulties in reconstructing an image of a 3D object (e.g., a patient tissue).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes detecting optical outputs generated by a plurality of scintillation crystals of a detector with an array of pixelated detectors; generating, with the array of pixelated detectors, respective signals indicative of the optical outputs; generating, from the respective signals, a unique energy spectrum correlated to each of the plurality of scintillation crystals; grouping subsets of the plurality of scintillation crystals into macrocrystals; determining a representative energy spectrum peak for each macrocrystal based on the respective energy spectra of the scintillation crystals in the macrocrystal; comparing a value of the representative energy spectrum peak for each macrocrystal with a target peak value; and adjusting an operating parameter of at least one pixelated detector in the array of pixelated detectors as a result of the comparison.

In another embodiment, a method includes detecting a first set of photons emitted from a first set of scintillation crystals with an array of pixelated detectors in a detector of a medical imaging system; detecting a second set of photons emitted from a second set of scintillation crystals with the array of pixelated detectors generating, with the array of pixelated detectors, respective signals indicative of the first and second sets of photons; generating an energy spectrum for each scintillation crystal in the first and second sets of scintillation crystals from the respective signals; grouping the first set of scintillation crystals into a first macrocrystal and the second set of scintillation crystals into a second macrocrystal, wherein the grouping is based on a first positional relationship between the first set of scintillation crystals and the array of pixelated detectors and a second positional relationship between the second set of scintillation crystals and the array of pixelated detectors; comparing a first value of a parameter of the energy spectra correlated to the scintillation crystals in the first macrocrystal with a target value of the parameter; comparing a second value of the parameter of the energy spectra correlated to the scintillation crystals in the second macrocrystal with the target value of the parameter; and adjusting an operational parameter of at least one pixelated detector in the array of pixelated detectors until the first and second values of the parameter and the target value of the parameter are within a predetermined range of one another.

In another embodiment, a medical imaging system is provided. The system includes a photodetector having a plurality of scintillation crystals adapted to interact with first photons to generate second photons, an array of pixelated detectors configured to receive the second photons and generate signals having a parameter proportional to a flux of the second photons. The system also includes processing circuitry configured to adjust at least one operational parameter of the photodetector, the circuitry having a processor configured to execute one or more sets of instructions to adjust the at least one operational parameter of the photodetector, and a memory storing the one or more sets of instructions executable by the processor to generate energy spectra for each scintillation crystal of the plurality of scintillation crystals based on the signals generated by the array of pixelated detectors; group the plurality of scintillation crystals into macrocrystals based on positional relationships between each scintillation crystal and the array of pixelated detectors; generate a photopeak for each macrocrystal, wherein each photopeak is representative of the energy spectra of the scintillation crystals within each macrocrystal; compare the photopeak of each macrocrystal with a target photopeak; and adjust the at least one operational parameter of at least one pixelated detector in the array of pixelated detectors until the photopeak of all of the macrocrystals and the target photopeak are within a predetermined range of one another.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Pixelated detectors include multi-anode PMTs and avalanche photodiodes. As noted above, one challenge associated with the use of scintillators optically coupled to an array of pixelated detectors is that the light yield across different scintillators may vary, and the response of the pixelated detectors may also vary. Further, the pixelated detectors may each have their own appropriate operating parameters, such as biasing voltages, and these biasing voltages may not be the same across the array. For example, breakdown voltages for silicon photomultipliers may not be the same across an array. Accordingly, the resulting data acquired using such configurations may be associated with increased processing time to generate a useful image, which reduces efficiency and is, therefore, costly.

The present embodiments provide computer-implementable methods for calibrating detector modules based on pixelated detector technologies to reduce the processing time and complexity associated with using pixelated detector-based photodetectors. In accordance with present embodiments, scintillation crystals in a detector module may be grouped together based on their spatial relationships relative to each pixelated detector in an pixelated detector array of a detector module. Signals generated by the pixelated detectors in response to photons emitted from the groups may be analyzed to determine a weighted mean photopeak for each group. The biasing voltage at which each pixelated detector is operated may be adjusted until each weighted mean photopeak for each scintillator group corresponds to a target value. For example, the biasing voltages may be adjusted until the weighted mean photopeak for each group coalesce with one another and with a target photopeak. Aligning the photopeaks by adjusting the biasing voltages calibrates the gain of each pixelated detector in the array of pixelated detectors.

The gamma photons used to generate the photons emitted from the scintillation crystals may be from an external source, such as a radiation source placed proximate the detector modules. By way of non-limiting example, the external source may be sodium-22 or cesium-137. Alternatively, the source of the gamma photons may be the intrinsic decay of one or more elements of the scintillation materials, such as the lutetium-176 present within cerium-doped lutetium yttrium orthosilicate (LYSO) scintillation crystals. After the gain is substantially equalized across the array, it may be desirable to adjust the coincidence timing resolution of the scintillators (e.g., in PET applications). By way of example, the biasing voltages of the pixelated detectors may be adjusted by a fixed offset above a certain voltage (e.g., the breakdown voltages determined by gain calibration) until a desired timing resolution is obtained.

While presently discussed in the context of positron emission tomography (PET) imaging, it should be noted that the present approaches are applicable to detector arrays in a number of medical imaging contexts, such as X-ray imaging, X-ray computed tomography (CT) imaging, and single photon emission computed tomography (SPECT) imaging. Indeed, any detector having scintillation crystals optically coupled to an array of pixelated detectors may benefit from the approaches disclosed herein. Therefore, while the present approaches are discussed in the context of PET imaging and detectors to facilitate discussion, they are also applicable to other imaging contexts as well.

Figure 1:
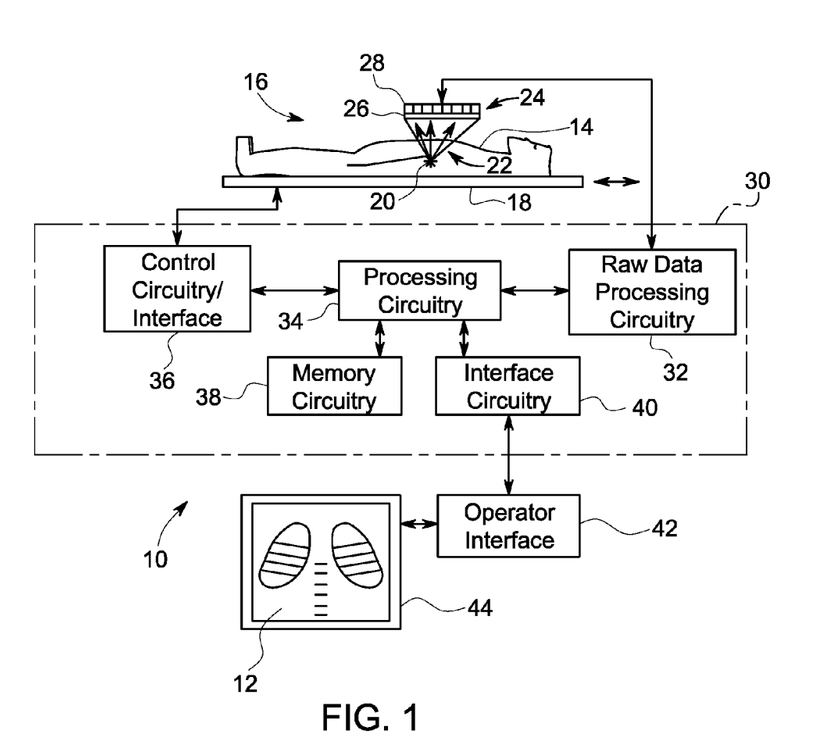
FIG. 1 is a diagrammatical illustration of an embodiment of a PET imaging system configured to generate images representative of a patient tissue, in accordance with an aspect of the present disclosure.

A diagrammatic representation of an example gamma ray imaging system is shown in FIG. 1. The system, designated generally by the reference numeral 10, is designed to produce diagnostically-useful images 12 of a subject 14, which may be all or a portion of a patient, and in other contexts may include baggage, a package, and so forth. The subject 14 is positioned in a scanner, designated by reference numeral 16 in which a support 18 is positioned. The support 18 may be movable within the scanner 16 to allow for imaging of different tissues or anatomies of interest within the subject 14. In some embodiments, a positron emitter may be administered to the patient, which produces positrons within the patient's body. The positrons interact with various electrons found within the patient's anatomy through an annihilation event 20, which produces gamma photons 22 that may be detected and processed to create an image.

In other embodiments, a radiotracer that emits the gamma photons 22 is administered to the patient, and may be bound or taken up by particular tissues or organs. Typical radioisotopes include various radioactive forms of elements, although many in gamma ray imaging are based upon an isotope of technetium ($^{99}$Tc) that emits the gamma photons 22 during decay. Various additional substances may be selectively combined with such radioisotopes to target specific areas or tissues of the body. In certain embodiments, the system 10 may be configured to detect the gamma radiation intrinsically emitted by the subject 14, such as for package screening purposes and radiation detection.

Gamma photons 22 emitted by the pharmaceutical agents in the patient or, in accordance with certain embodiments used for calibration, emitted by a radioactive standard, are detected by a gamma camera or digital detector 24. Digital detector 24 may be used for various radionuclide imaging techniques including single proton emission computed tomography (SPECT) and positron emission tomography (PET). Although illustrated in the figure as a planar device positioned above the patient, in practice the detector 24 may be positioned below the patient, both above and below the patient, and may wrap at least partially around the patient (e.g., in a ring). In general, the detector 24 may include one or more collimators and a plurality of scintillation crystals, together represented generally as reference numeral 26. The collimator allows gamma radiation emitted only in certain directions (typically perpendicular to the scintillator) to impact the scintillator. The scintillator, which may include a crystalline material, such as cerium-doped lutetium yttrium orthosilicate (LYSO), converts the received gamma radiation to lower energy light energy (e.g., in an ultraviolet range). In other imaging modalities, such as those that utilize X-rays, the scintillator may generate the lower light energy upon interaction with received X-rays. Pixelated detectors 28 then receive this light and generate image data corresponding to photons impacting specific discrete picture element (pixel) regions.

The digital detector 24 is coupled to system control and processing circuitry 30. This circuitry may include a number of physical and functional components that cooperate to allow the collection and processing of image data to create the desired images, and also for performing the calibration methods disclosed herein. For example, the circuitry may include raw data processing circuitry 32 that initially receives the data from the digital detector 24, and that may perform various filtering, value adjustments, and so forth. Processing circuitry 34 allows for the overall control of the imaging system, and for manipulation of image data. The processing circuitry 34 may also perform calibration functions, correction functions, and so forth on the data. For example, the processing circuitry 34 may adjust the respective biasing voltages of each of the pixelated detectors 28 until the gains of the pixelated detectors 28 are substantially equalized. In embodiments where the pixelated detectors 28 are operated in a PET system, processing circuitry 34 may also adjust the coincidence timing resolution of the digital detector 24 by adjusting the bias voltages of all of the pixelated detectors 28 by a fixed amount.

The processing circuitry 34 may also perform image reconstruction functions, such as based on known algorithms (e.g., backprojection). Such functions may also be performed in post-processing on local or remote equipment (not shown). The processing circuitry 34 may interact with control circuitry/interface 36 that allows for control of the scanner and its components, including the patient support, camera, and so forth. Moreover, the processing circuitry 34 will be supported by various circuits, such as memory circuitry 38 that may be used to store image data, calibration or correction values, routines performed by the processing circuitry, and so forth. In accordance with present embodiments, the memory circuitry 38 may store one or more sets of instructions that are executable by the processing circuitry 34 to calibrate the gain across the pixelated detectors 28 of the digital detector 24.

The processing circuitry 24 may also interact with interface circuitry 40 designed to support an operator interface 42. The operator interface 42 allows for imaging sequences to be commanded, scanner and system settings to be viewed and adjusted, images to be viewed, calibrations to be performed, and so forth. In the illustrated embodiment, the operator interface includes a monitor 44 on which reconstructed images 12 may be viewed.

In an institutional setting, the imaging system 10 may be coupled to one of more networks to allow for the transfer of system data to and from the imaging system, as well as to permit transmission and storage of image data and processed images. For example, a local area networks, wide area networks, wireless networks, and so forth may allow for storage of image data on radiology department information systems or on hospital information systems. Such network connections further allow for transmission of image data to remote post-processing systems, physician offices, and so forth.

Figure 2:
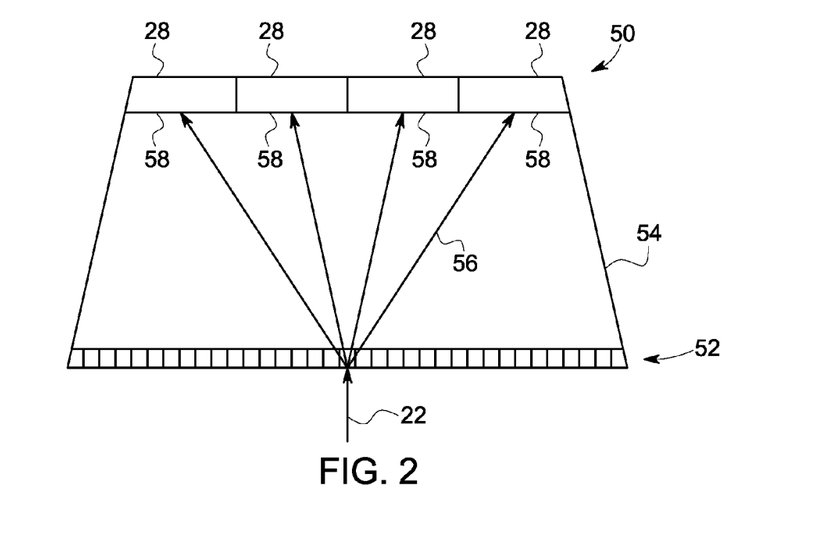
FIG. 2 is a cross-sectional side view of an embodiment of a detector module having a plurality of scintillation crystals optically coupled to a solid state photomultiplier pixelated detector array, in accordance with an aspect of the present disclosure.

FIG. 2 is cross-sectional side view of an embodiment of a detector module 50 of the digital detector 24 having a plurality of scintillation crystals 52 and a plurality of pixelated detectors 28. It will be appreciated that the detector module 50 may include more or less features than those presently illustrated. Accordingly, it should be noted that the detector module 50 is illustrated as having example components that may be utilized in accordance with present embodiments. As discussed above with respect to the digital detector 24, the detector module 50 may be positioned above or below the patient, both above and below the patient, rotate about the patient, or may wrap at least partially around the patient. Furthermore, while the illustrated embodiment shows four pixelated detectors 28, in practice the detector module 50 may include numerous pixelated detectors 28 in a two dimensional array. By way of non-limiting example, in some embodiments, the pixelated detectors 28 may be arranged in a grid pattern.

As shown in the illustrated embodiment, the plurality of scintillation crystals 52 is placed on a light guide 54. In certain embodiments, the light guide 54 may be made from a transparent material, a reflective material, or a combination thereof. The plurality of scintillation crystals 52 include one or more crystalline materials, such as sodium iodide (NaI), LYSO, or lutetium orthosilicate (LSO), or any scintillating crystalline material. As will be appreciated, the thickness of the scintillation crystals 52 may vary for different imaging applications. The thickness and taper angles of the light guide may also vary for different imaging applications. Indeed, in certain embodiments no light guide may be present.

During operation of the detector module 50, gamma photons 22 interact with the plurality of scintillation crystals 52 to produce lower energy photons 56, such as ultraviolet (UV) photons, visible photons, or a combination thereof. The lower energy photons strike respective surfaces 58 of the pixelated detectors 28. The array of pixelated detectors 28 may generate image data based on the lower energy photons 56 (i.e., an optical signal) received from the plurality of scintillation crystals 52. More particularly, known algorithms, such as the Anger algorithm, may be used to generate image data by estimating an origin of interaction between the gamma photon 22 and one scintillation crystal of the plurality of scintillation crystals 52 in a 2D Cartesian plane. In one embodiment, weighted sums of the analog pulses from all the pixelated detectors 28 are computed to estimate the total energy of the gamma photon 22, E, and to localize the absorption event in X and Z, with X and Z being the Cartesian coordinates over the surface of the pixelated detector array. This information can then be used to compute the energy and coincidence timing resolution for each crystal within the plurality of scintillation crystals 52.

Each pixelated detector in the plurality of pixelated detectors 28 may include avalanche photodiodes that are operated using a biasing voltage and are connected together via a network of resistors. In certain embodiments, the pixelated detectors 28 are operated in Geiger mode, where the avalanche photodiodes are operated above their breakdown voltage and produce an output pulse that is proportional to the number of photons incident on the surface 58 of the pixelated detector 28. As noted above, the number and energy of the lower energy photons 56 yielded by the scintillation crystals may not be equal across each scintillation crystal, and the gain of the pixelated detectors may not be equal across each pixelated detector 28. These differences across the detector module 50 and, therefore, the entire detection system of a PET scanner, can make image reconstruction of the 3D object more computationally expensive and challenging.

Figure 3:
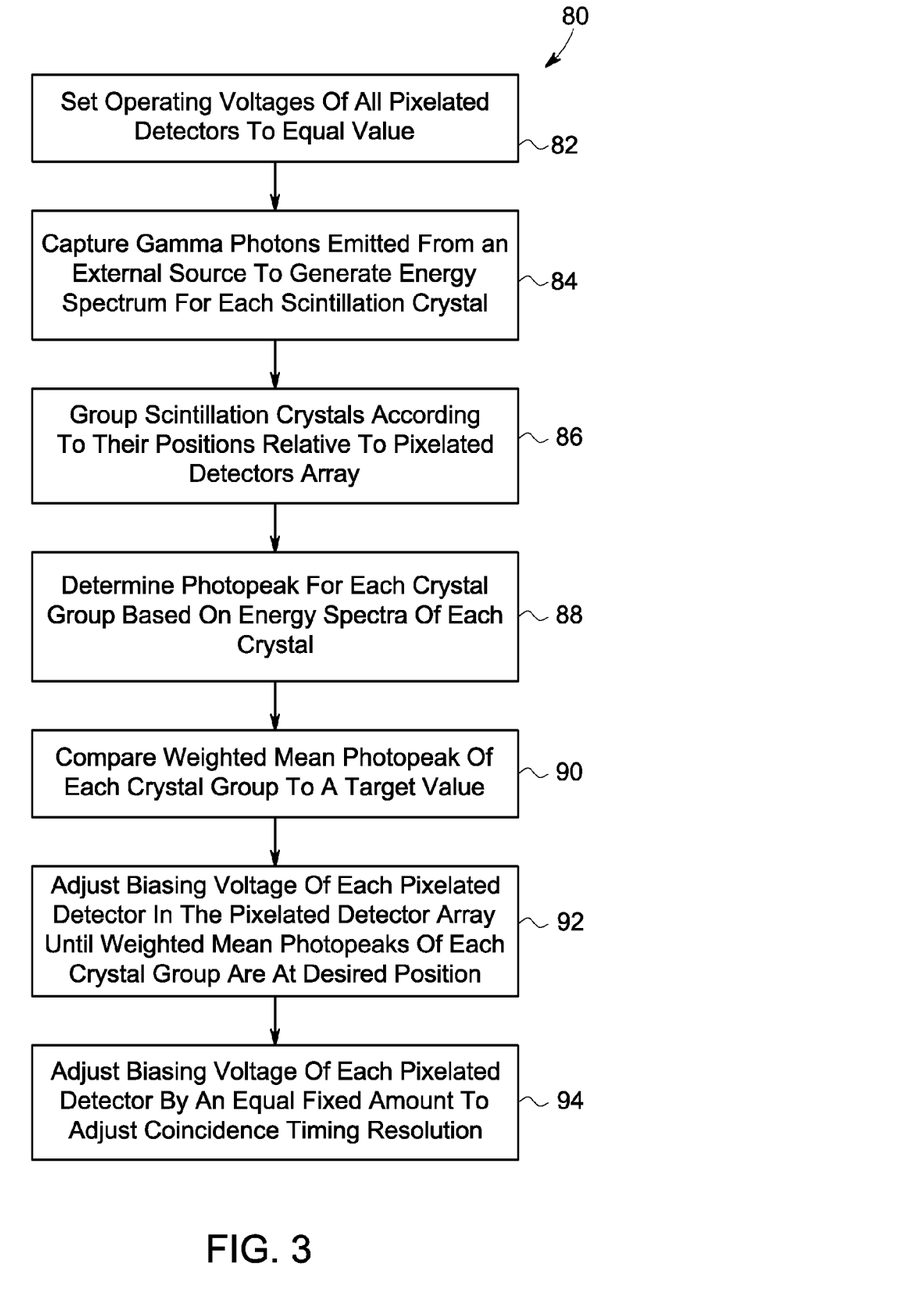
FIG. 3 is a process flow diagram of an embodiment of a method for calibrating the gain of an array of pixelated detectors using an external radiation source, in accordance with an aspect of the present disclosure.

To address the issue of non-uniformity in the operating parameters of the pixelated detectors 28 and the non-uniformity of light yield between the plurality of scintillation crystals 52, the present embodiments provide approaches for calibrating the gains of the pixelated detectors 28, which may result in enhanced energy and coincidence timing resolution for the digital detector 24. One embodiment of such a method is illustrated as a process flow diagram in FIG. 3. Specifically, FIG. 3 illustrates an embodiment of a method 80 for calibrating the gain of an array of pixelated detectors (e.g., pixelated detectors 28 of FIG. 2).

The method 80 may be performed, as noted above with respect to FIG. 1, by the processing and control circuitry 34 in combination with the memory circuitry 38. For example, the memory 38, which may be a non-transitory machine-readable medium, may store one or more sets of instructions as code. One or more processors of the processing and control circuitry 34 may be configured to execute the code to perform the acts of method 80. Thus, in one embodiment, the method 80 may be performed automatically by the circuitry 30.

The method 80 includes setting the operating voltage of each pixelated detector 28 of the array of pixelated detectors in a given detector (e.g., detector 50) to an equal value (block 82). For example, in embodiments where it is desirable to operate the pixelated detectors in Geiger mode, the voltage may be above an expected breakdown voltage of the pixelated detectors based on their particular configuration. Absent any differences between the gains of the pixelated detectors, this would result in a substantially equal response from all the pixelated detectors to incident photons from the scintillation crystal array.

Figure 4:
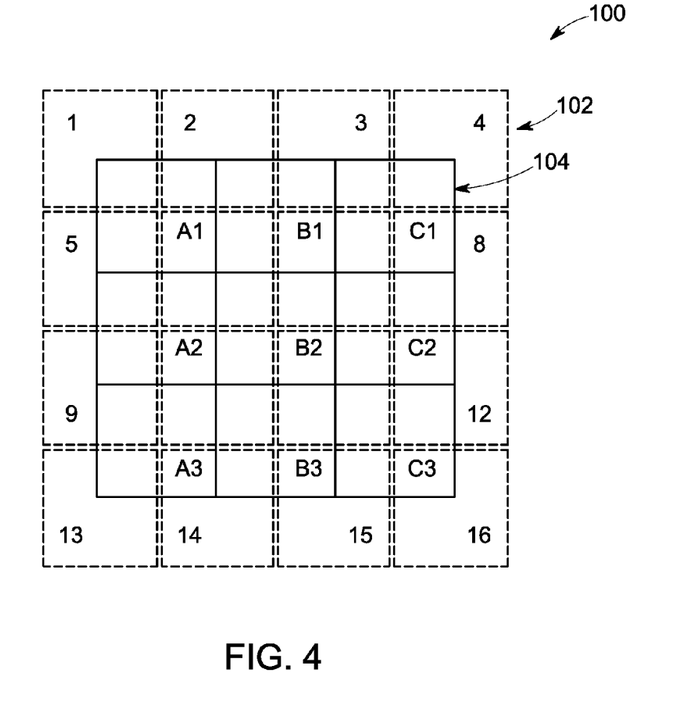
FIG. 4 is a diagrammatical illustration of an embodiment of an arrangement of a scintillation crystal grid disposed over an pixelated detector grid, in accordance with an aspect of the present disclosure.

The method 80 also includes capturing gamma photons emitted from an external source, such as one or more annihilation events within a patient or a radioactive decay event from a radioactive source, with the scintillation crystals to generate an energy spectrum for each scintillation crystal (block 84). For example, the acts according to block 86 may include capturing the gamma photons with the scintillation crystals, and generating lower energy photons as a result of the interaction between the gamma photons and the scintillation crystals. The lower energy photons are detected by the pixelated detectors, which in turn generate a signal that can be used to produce a composite energy spectrum. The composite energy spectrum is an energy spectrum representing a combination of the energy spectra of each of the scintillation crystals in a given crystal array. Using an algorithm, such as Anger logic, the composite energy spectrum is de-convoluted into discrete energy spectra that can each be correlated to a particular scintillation crystal within the scintillation crystal array. Thus, an energy spectrum is generated for and correlated to each scintillation crystal. For example, FIG. 4, illustrates an arrangement of an array of scintillation crystals 102, labeled as 1-16, disposed over an array of pixelated detectors 104, labeled as A1, A2, A3, B1, B2, B3, C1, C2, and C3. In accordance with block 84, the signals generated by the detectors of the detector array 104 may be used to generate energy spectra for the grid of scintillation crystals 102.

It should be noted that in embodiments where the method 80 is performed in a system that detects X-rays, such as an X-ray CT imaging system, X-ray photons may be generated by the external source, rather than gamma photons. In such embodiments, the scintillation crystals 52 interact with the X-ray photon to generate the lower energy photons 56. These photons 56 are used to detect a location at which the X-ray photon interacted with a scintillation crystal.

It may be appreciated that each scintillation crystal in the crystal array 102 may produce photons that, upon detection by the pixelated detector array 104, have a maximum signal, or photopeak, within their respective energy spectra. Indeed, each scintillation crystal may produce a plurality of photons that may be incident on any one or a combination of the pixelated detectors 104. By way of example, crystal 10 may produce photons that are incident at least on detectors A2, A3, B2 and B3. Likewise, each detector may detect photons produced by a plurality of scintillation crystals. For example, detector B2 may detect photons produced by crystals 7, 8, 10, 11, and so on. Therefore, in some embodiments, the energy spectrum correlated to each scintillation crystal may be dependent on the operating parameters (e.g., the gain) of any one or a combination of the pixelated detectors 104. Indeed, in one embodiment, the photopeak for each crystal may be determined based on the response (which is affected by the gain) of all of the pixelated detectors in the array 104.

Accordingly, absent any further steps, at least in theory, it may be possible to adjust the gain of each of the pixelated detectors 104 in an attempt to match the photopeak of some of the scintillation crystals to a desired or a target value, which may be a known photopeak value for the scintillation crystal material. However, in practice, such adjustments may be difficult due to varying degrees of optical coupling between certain scintillation crystals and the detector array 104, among other factors. For example, crystals located at corners or edges of the arrangement 100 (e.g., crystals 1, 4, 13, 16, and 2, 3, 5, 9, 8, 12, 14, and 15, respectively) may not have the same level of optical coupling to the detector array 104 as crystals located toward the center of the arrangement 100. This may result in less than all of the photons produced by each scintillation crystal being detected. Thus, due to these differences, the gain adjustment that leads to a suitable adjustment for one scintillation crystal may not necessarily correspond to the gain adjustment suitable for every other scintillation crystal.

Therefore, in accordance with present embodiments, after the energy spectra for the scintillation crystals have been generated in accordance with block 84, the scintillation crystals in the crystal array may be grouped into subsets based on their positioning relative to pixelated detectors 28 in the pixelated detector array (block 86). In certain embodiments, grouping the scintillation crystals in this way may facilitate signal analysis and gain adjustment, as discussed in further detail below. As an example of the manner by which the scintillation crystals may be grouped, crystals 1, 2, 5, and 6, which are at least partially disposed over pixelated detector A1, may be grouped together. In accordance with the present disclosure, the combination of crystals in this way may be denoted as a macrocrystal. Thus, crystals 1, 2, 5, and 6 may form a macrocrystal correlated to detector A1. Indeed, several such macrocrystals may be produced in accordance with block 86. As discussed in detail below, the macrocrystals may enable the use of a single photopeak for a group of scintillation crystals during gain adjustment.

After the scintillation crystals have been grouped into macrocrystals in accordance with block 86, a photopeak may be determined for each macrocrystal using the energy spectra of the individual scintillation crystals in the macrocrystal (block 88). For example, for a macrocrystal formed from grouping crystals 1, 2, 5, and 6, the energy spectra for crystals 1, 2, 5, and 6 may be used to generate a photopeak for the macrocrystal. By way of example, the photopeak may be a mean photopeak generated by averaging the photopeaks for crystals 1, 2, 5, and 6, or may be a composite photopeak generated by performing a weighted sum of the photopeaks of crystals 1, 2, 5, and 6. In embodiments where a composite photopeak is used for the macrocrystal, the weight given to each crystal for the weighted sum may be determined based on, for example, an amount of optical coupling between the given crystal and the detector used to determine the macrocrystal. By way of non-limiting example, the area of the crystal above the detector used to determine the macrocrystal grouping (e.g., the area of crystal 1 over detector A1 for the macrocrystal formed from crystals 1, 2, 5, and 6) may determine the weight given to the crystal. Indeed, while averaging or weighted summing is presently discussed, any manner of determining a photopeak for the macrocrystals is presently contemplated.

After the photopeaks are determined in accordance with block 88, the photopeaks of the macrocrystals may be compared to a target value, such as an expected photopeak for the scintillation crystal material (block 90). Thus, in accordance with the present disclosure, a single comparison between a mean or composite photopeak and a target photopeak may be made for a group of scintillation crystals using the macrocrystal photopeak. Thus, the comparison of the photopeaks of the macrocrystals with the target value is, in essence, a comparison of a portion of the overall composite energy spectrum produced in block 84 with the target photopeak value.

Figure 5:
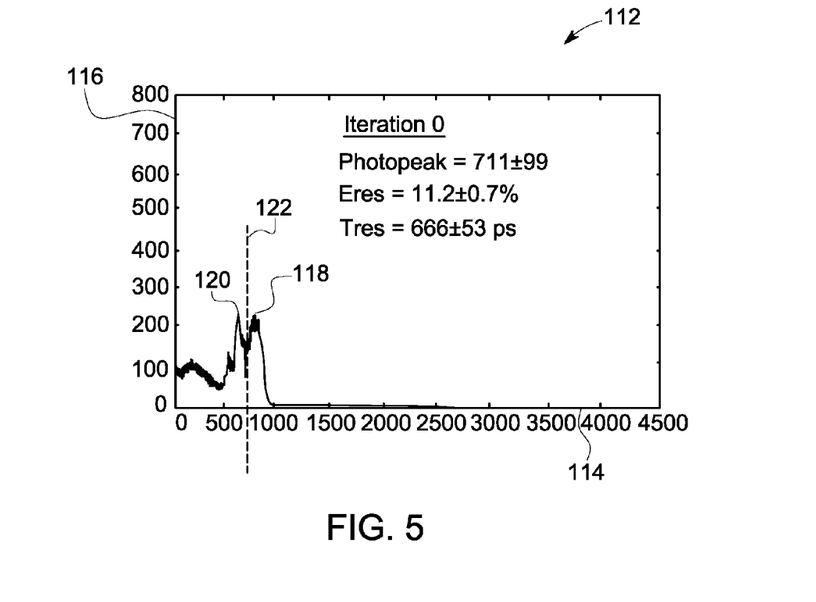
FIG. 5 is an embodiment of an energy spectrum produced by the arrangement of FIG. 4 before calibration of the pixelated detector grid, in accordance with an aspect of the present disclosure.

For example, FIG. 5 illustrates an example of a composite energy spectrum 112 plotting photon count 116 as a function of energy 114 generated in an analog-to-digital conversion (ADC) channel. The energy spectrum 112 is representative of an equal biasing voltage applied to all of the pixelated detectors, i.e., no gain calibration iterations, and large photopeaks 118 and 120 represent photopeaks of different scintillation crystals. Indeed, in an embodiment, the values of peaks 118 and 120 may each correspond to a photopeak of a macrocrystal. However, it should be noted that the values represented by large peaks in the composite energy spectrum 112 may or may not correspond to photopeak values for the macrocrystals. In FIG. 5, the peaks 118 and 120 do not align, and are not within a predetermined range of a target value, which, for the purposes of illustration, may correspond to a value represented by line 122. The predetermined range may depend upon certain predetermined threshold parameters correlative to a desired response of the detector module 50. In other words, a certain overall inaccuracy in the measured energy of the high energy photon may be tolerated by the detector module 50.

Figure 6:
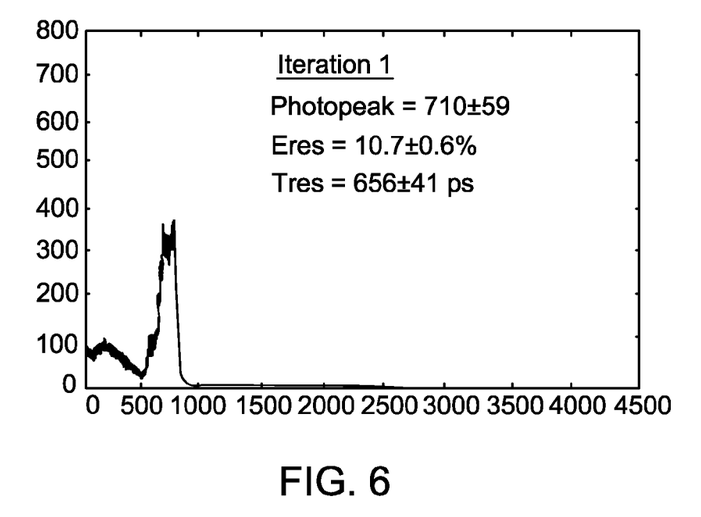
FIG. 6 is an embodiment of the energy spectrum of FIG. 5 after performing one iteration of gain adjustment using the method of FIG. 3, in accordance with an aspect of the present disclosure.
Figure 7:
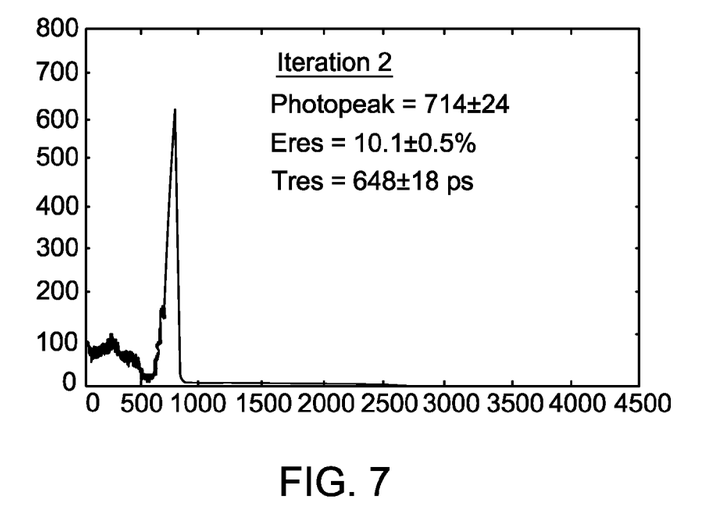
FIG. 7 is an embodiment of the energy spectrum of FIG. 5 after performing two iterations of gain adjustment using the method of FIG. 3, in accordance with an aspect of the present disclosure.
Figure 8:
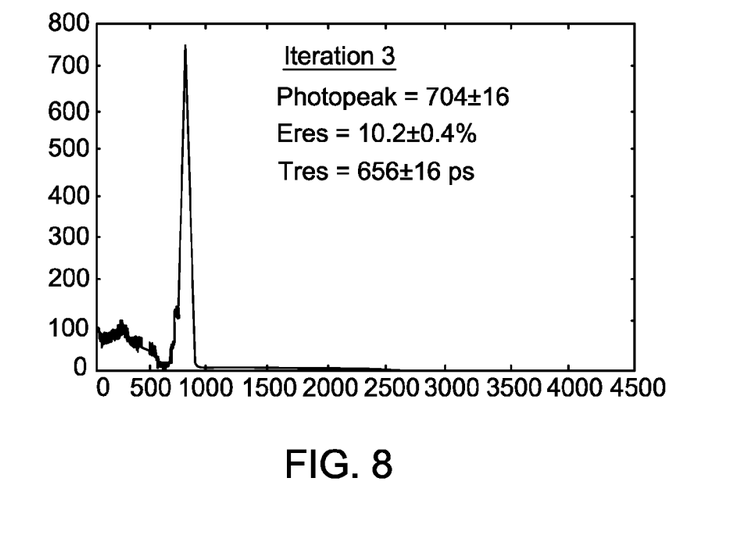
FIG. 8 is an embodiment of the energy spectrum of FIG. 5 after performing three iterations of gain adjustment using the method of FIG. 3, in accordance with an aspect of the present disclosure.

Returning to the method 80 in FIG. 3, upon performing the comparison according to block 90, the biasing voltages of each of the pixelated detectors are adjusted via a series of iterations until the photopeaks for all of the macrocrystals correspond to a desired value (block 92). For example, the biasing voltages of each pixelated detector may be adjusted until the photopeaks of the macrocrystals coalesce and have substantially the same photopeak value, as illustrated in FIGS. 6-8. Specifically, FIGS. 6-8 illustrate the progression of the large photopeaks 118, 120 of the composite spectrum 112 (FIG. 5) as the bias voltages of the pixelated detectors are iteratively adjusted. As the iterations progress from FIG. 6 to FIG. 8, the bias voltages on each of the pixelated detectors are adjusted to equalize the photopeaks of the macrocrystals. The captions in each of FIGS. 6-8 display the mean and standard deviation of the photopeak positions, and the energy and coincidence timing resolution across the crystals in the crystal array. As the iterations progress, the spread in the photopeak and the energy and coincidence timing resolution all decrease.

In embodiments where the method 80 is performed for a PET imaging system, once the biasing voltages of the pixelated detectors are all adjusted, the biasing voltages of every pixelated detector may be adjusted by a fixed amount to adjust a coincidence timing and energy resolution of the scintillation crystals 52 (block 94). The amount of biasing voltage added to the pixelated detectors may be determined by a number of factors, including the relationship between the applied bias voltage and the dark current generated in the pixelated detectors and the photon detection efficiency (PDE) of the pixelated detector array.

While the method 80 of FIG. 3 includes calibrating the gain for the pixelated detectors using radiation emitted from an external source, it may be desirable to utilize the intrinsic radiation of one or more elements of the scintillation crystals that undergo radioactive decay. By way of non-limiting example, the Lu-176 present within LYSO scintillation crystals may be utilized for such calibration. Other radioactive elements may include, but are not limited to, uranium, thorium, hafnium, samarium, potassium, and so forth. Indeed, any radioactive element present within a scintillation crystal may be used in accordance with the present disclosure.

Figure 9:
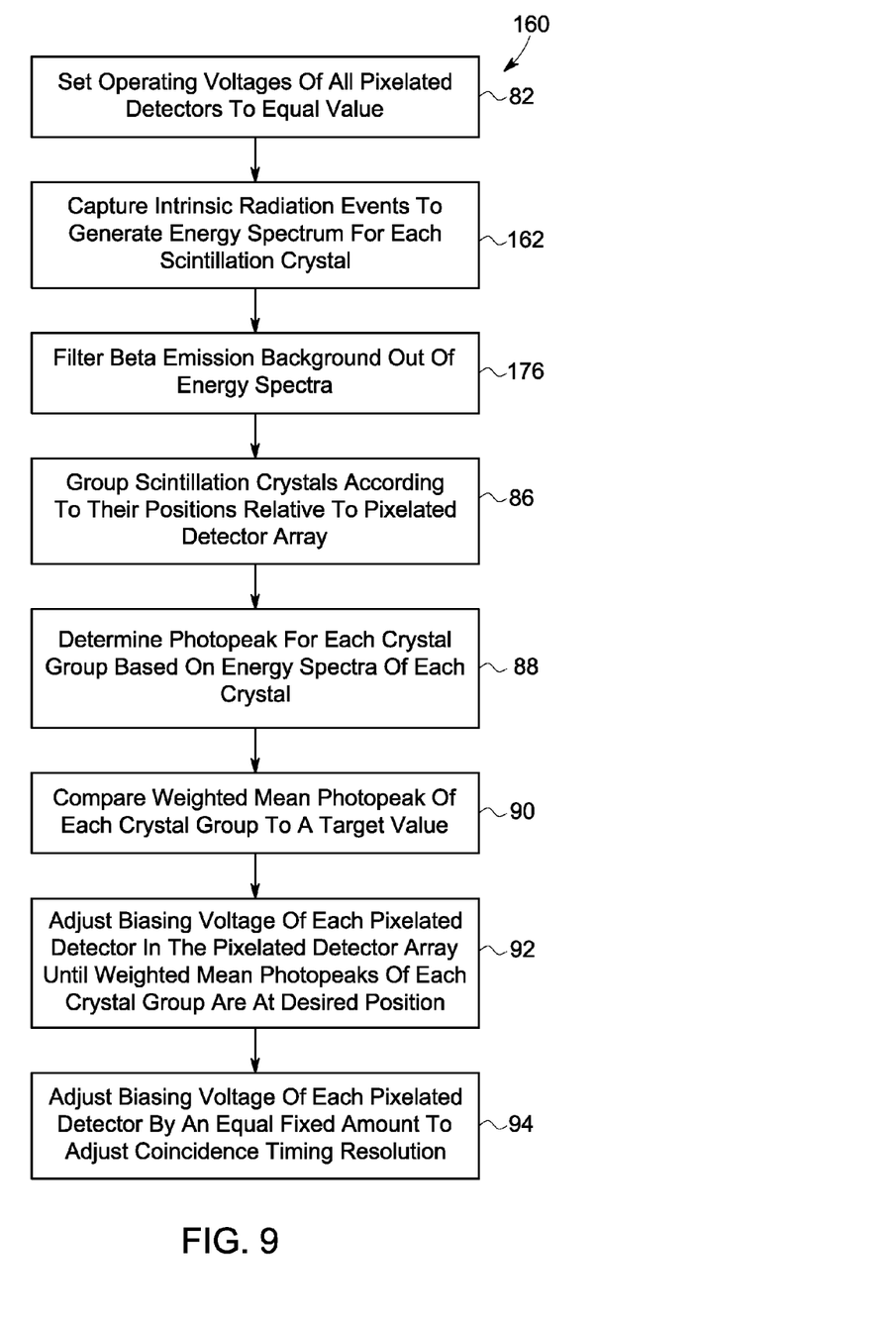
FIG. 9 is a process flow diagram of an embodiment of a method for calibrating the gain of an array of pixelated detectors using the intrinsic radiation of a scintillation crystal array, in accordance with an aspect of the present disclosure.

FIG. 9 is a process flow diagram illustrating one such embodiment of a method 160 for calibrating the pixelated detectors using the intrinsic radiation of the scintillation crystals. As noted above, the processing and control circuitry 34 may be configured to execute one or more sets of instructions stored (e.g., as code) on the memory circuitry 38 to perform the acts of method 160. Thus, the method 160 may be performed all or in part by the circuitry 30.

The method 160 includes setting the operating voltages of the pixelated detectors to equal values, as set forth above with respect to FIG. 3 (block 82). In accordance with present embodiments, the intrinsic radiation produced by the radioactive elements in the scintillation crystals is detected as the high energy photons (e.g., gamma photons 22 of FIG. 2) to generate energy spectra for each crystal (block 162). For example, the acts associated with block 162 may be substantially the same as the acts discussed above with respect to block 84 of FIG. 3, except that the source of radiation is the scintillation crystals of the crystal array.

Figure 10:
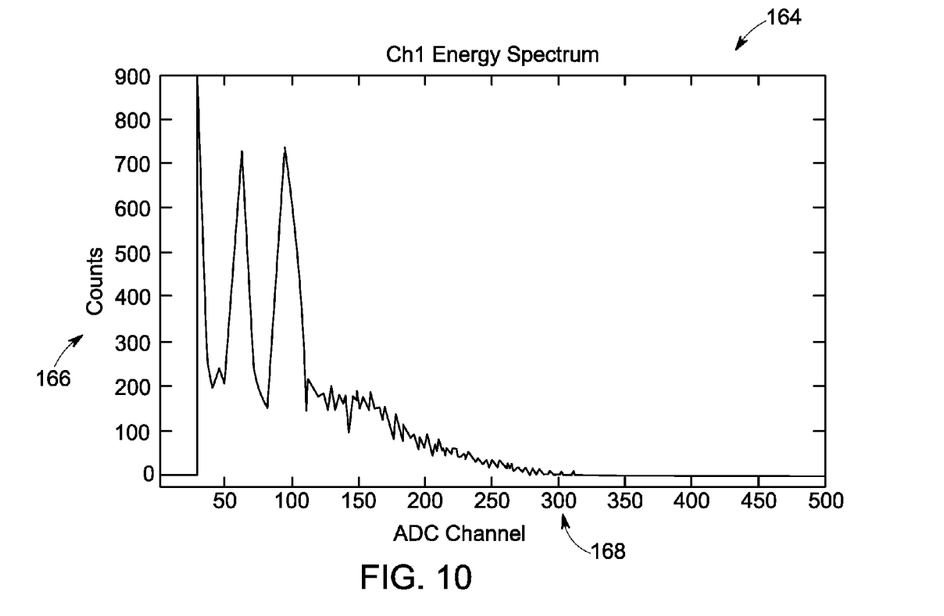
FIG. 10 is an energy spectrum based upon an output of a photomultiplier tube (PMT) channel upon detecting photons generated from scintillation due to interactions with intrinsic radiation from lutetium-176 contained within a scintillation crystal array.
Figure 11:
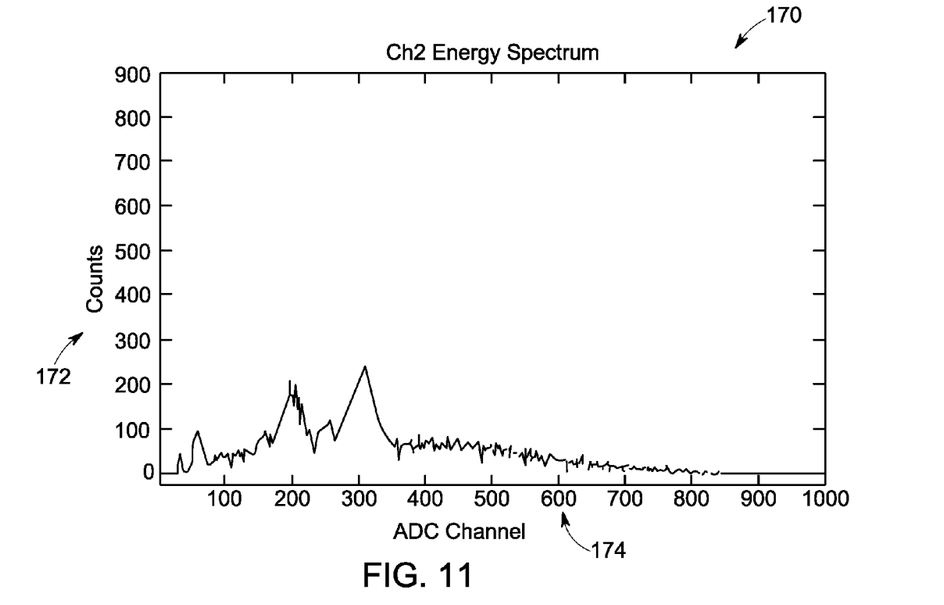
FIG. 11 is an energy spectrum based upon an output of an pixelated detector channel upon detecting photons generated from scintillation due to interactions with intrinsic radiation from lutetium-176 contained within a scintillation crystal array; in accordance with an aspect of the present disclosure.

However, the methods 80 and 160 differ at least in that the energy spectra originally produced in block 162 include a beta emission background due to the beta emission of the radioactive isotope (e.g., the Lu-176). Moreover, the optical signal generated by each macrocrystal may be weak, and may have a relatively low signal-to-noise ratio compared to the spectra produced in accordance with method 80. Example plots of energy spectra resulting from the decay of Lu-176 blocks placed on a single anode PMT and a pixelated detector array in coincidence with one another are illustrated in FIGS. 10 and 11. Specifically, FIG. 10 is a plot 164 of data collected at a first ADC channel, Ch1, for single anode PMT. The plot 164 depicts photon count 166 as a function of the digital signal 168 at the first channel. FIG. 11 is a plot 170 of data collected at a second ADC channel, Ch2, for the pixelated detector array. The plot 170 depicts photon count 172 as a function of the digital signal 174 at the second channel. Both plots 164, 170 depict two prominent peaks corresponding to two intrinsic spectral lines of Lu-176 at 202 and 307 keV. Again, these spectral lines are superimposed on a beta emission background.

Figure 12:
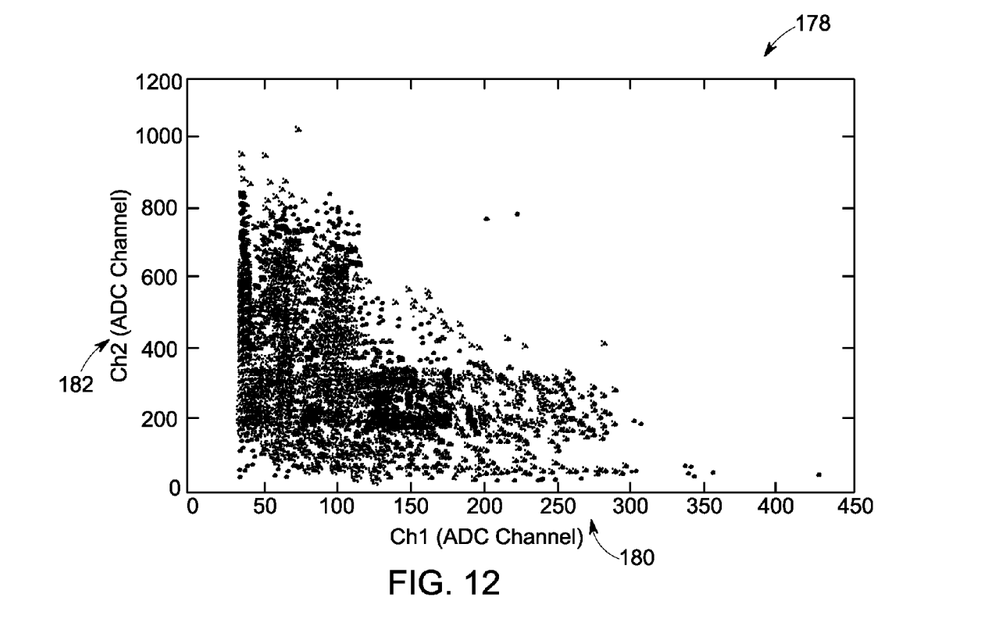
FIG. 12 is a combined plot of determined energies of the lutetium-176 emission for the channels of FIGS. 10 and 11, in accordance with an aspect of the present disclosure.

Returning to method 160 of FIG. 9, the beta emission background may be filtered or minimized from the plots 164, 170 using a coincidence method between neighboring arrays of detector elements (e.g., neighboring pixelated detector arrays or an pixelated detector array neighboring a PMT array) (block 176). To filter the beta emission, in one embodiment, the energy of each event corresponding to an interaction between the gamma photons emitted by the Lu-176 and the scintillation crystals is recorded on the PMT (Ch1) and the pixelated detector array (Ch2). An embodiment of a plot 178 of the recorded energies at the first channel 180 and the second channel 182 is illustrated in FIG. 12.

Figure 13:
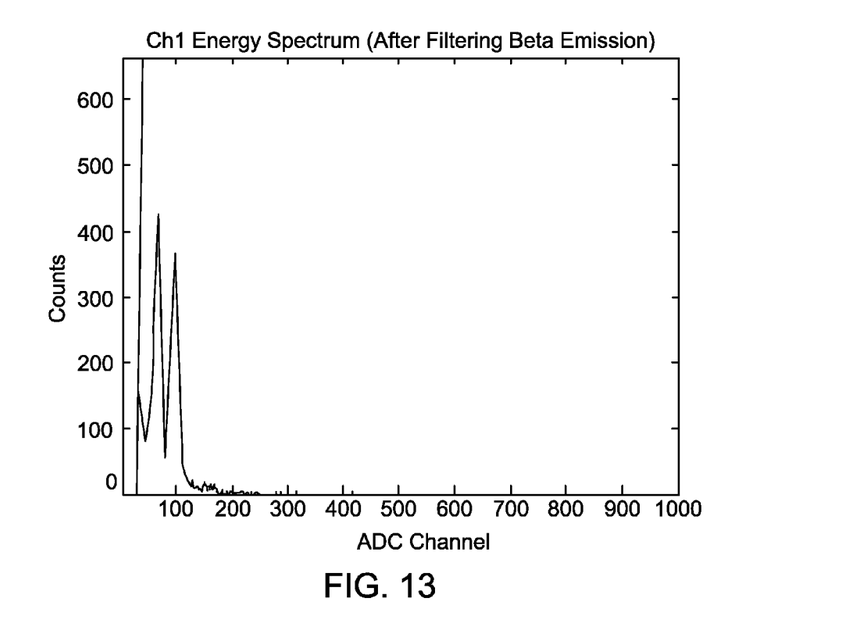
FIG. 13 is a filtered energy spectrum corresponding to the plot of FIG. 10 in which beta emission has been filtered out, in accordance with an aspect of the present disclosure.
Figure 14:
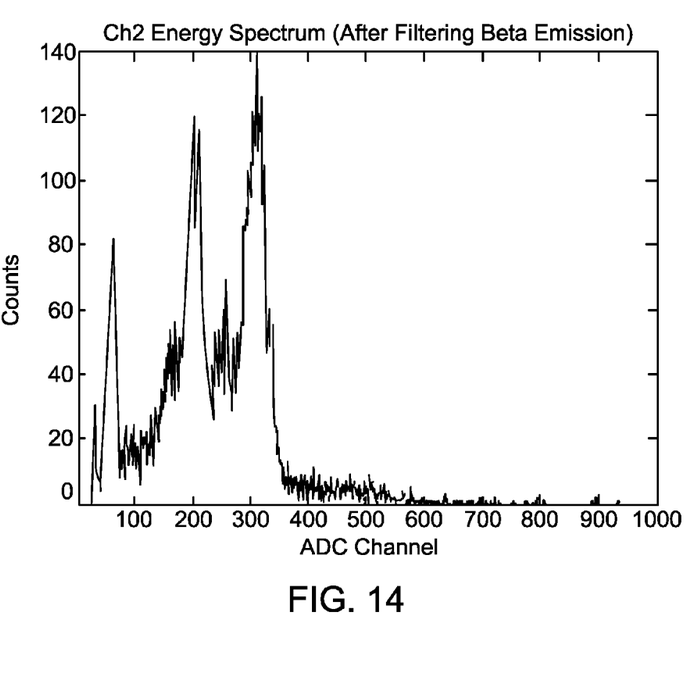
FIG. 14 is a filtered energy spectrum corresponding to the plot of FIG. 11 in which beta emission has been filtered out, in accordance with an aspect of the present disclosure.

In one embodiment, the beta emission recorded on Ch1 can be minimized or filtered by choosing events that correspond to energies higher than 307 keV (above ADC channel=360) in Ch2. Similarly, the beta emission recorded on Ch2 can be filtered by choosing events that correspond to energies higher than 307 keV (above ADC channel=110) in Ch1. These events correspond to beta decay events in one blocklet that are coincident to 307 keV and 202 keV gamma photons in the neighboring blocklets. The resulting filtered spectra for Ch1 and Ch2 are illustrated in FIGS. 13 and 14, respectively. As illustrated in FIGS. 13 and 14, the peaks corresponding to the emission lines of the Lu-176 are more prominent compared to the corresponding peaks illustrated in FIGS. 10 and 11 due to filtering the beta emission signal.

Returning to method 160 of FIG. 9, once the filtered spectra are obtained in accordance with block 176, the scintillation crystals are grouped according to their positions relative to at least one pixelated detector in the pixelated detector array (block 84), which is discussed above with respect to FIG. 3. Indeed, the photopeaks of the resulting macrocrystals are then determined according to block 88, which is also described above with respect to FIG. 3. Accordingly, the gains of the pixelated detectors may be calibrated in a similar manner to that described above for method 80 with respect to FIG. 3. Thus, the photopeaks of the macrocrystals may be compared to a target value or photopeak in accordance with block 90. The biasing voltages of the pixelated detectors may be iteratively adjusted until the photopeaks of the energy spectra are at a desired position with respect to one another and with respect to the target value (block 92), which calibrates the gain for each pixelated detector. The coincidence timing and energy resolution may then be adjusted based on the acts set forth above with respect to block 94 of FIG. 3.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    detecting optical outputs generated by a plurality of scintillation crystals of a detector with an array of pixelated detectors;
    generating, with the array of pixelated detectors, respective signals indicative of the optical outputs;
    generating, from the respective signals, a unique energy spectrum correlated to each of the plurality of scintillation crystals;
    grouping subsets of the plurality of scintillation crystals into macrocrystals;
    determining a representative energy spectrum peak for each macrocrystal based on the respective energy spectra of the scintillation crystals in the macrocrystal;
    comparing a value of the representative energy spectrum peak for each macrocrystal with a target peak value; and
    adjusting an operating parameter of at least one pixelated detector in the array of pixelated detectors as a result of the comparison.

2. The method of claim 1, wherein determining the representative energy spectrum peak for each macrocrystal comprises determining a mean photopeak based on photopeaks in the respective energy spectra of each macrocrystal.

3. The method of claim 1, wherein determining the representative energy spectrum peak for each macrocrystal comprises determining a photopeak based on a weighted sum of photopeaks in the respective energy spectra of the scintillation crystals in each macrocrystal, wherein the weight given to each photopeak for the weighted sum is representative of a degree of optical coupling between the scintillation crystal correlating to the photopeak and the array of pixelated detectors.

4. The method of claim 1, wherein adjusting the operating parameter of the at least one pixelated detector comprises adjusting a biasing voltage of the at least one pixelated detector until the value of the representative energy spectrum peak and the target peak value are substantially the same.

5. The method of claim 1, wherein grouping subsets of the plurality of scintillation crystals into macrocrystals comprises grouping the subsets based on their positions relative to pixelated detectors in the pixelated detector array.

6. The method of claim 1, comprising independently adjusting the biasing voltage of the entire array of pixelated detectors until the value of the representative energy spectrum peak and the target peak value are substantially the same.

7. The method of claim 6, comprising setting the biasing voltage of the entire array of pixelated detectors to a substantially equal first value before detecting the optical outputs.

8. The method of claim 7, wherein the first value is above an expected breakdown voltage for the pixelated detectors.

9. The method of claim 7, comprising increasing the biasing voltage of the entire array of pixelated detectors by a fixed, substantially equal amount after independently adjusting the biasing voltage of the entire array of pixelated detectors until the value of the representative energy spectrum peak and the target peak value are substantially the same to adjust a coincidence timing resolution of the detector.

10. The method of claim 9, wherein the fixed, substantially equal amount is correlative to a desired coincidence timing resolution.

11. The method of claim 1, comprising generating the optical outputs with the plurality of scintillation crystals upon interaction with a gamma photon resulting from emission by a source external to the detector.

12. The method of claim 1, comprising generating the optical outputs with the plurality of scintillation crystals upon interaction with a gamma photon resulting from emission intrinsic to the plurality of scintillation crystals of the detector.

13. The method of claim 12, comprising removing, from the energy spectra correlated to each of the plurality of scintillation crystals, data relating to beta emissions of the plurality of scintillation crystals.

14. The method of claim 1, wherein the detector is a part of a medical imaging system, wherein the medical imaging system is a positron emission tomography (PET) imaging system, a single photon emission computed tomography (SPECT) imaging system, an X-ray imaging system, an X-ray computed tomography (CT) imaging system, or any combination thereof.

15. A method, comprising:
detecting a first set of photons emitted from a first set of scintillation crystals with an array of pixelated detectors in a detector of a medical imaging system;
detecting a second set of photons emitted from a second set of scintillation crystals with the array of pixelated detectors
generating, with the array of pixelated detectors, respective signals indicative of the first and second sets of photons;
generating an energy spectrum for each scintillation crystal in the first and second sets of scintillation crystals from the respective signals;
grouping the first set of scintillation crystals into a first macrocrystal and the second set of scintillation crystals into a second macrocrystal, wherein the grouping is based on a first positional relationship between the first set of scintillation crystals and the array of pixelated detectors and a second positional relationship between the second set of scintillation crystals and the array of pixelated detectors;
comparing a first value of a parameter of the energy spectra correlated to the scintillation crystals in the first macrocrystal with a target value of the parameter;
comparing a second value of the parameter of the energy spectra correlated to the scintillation crystals in the second macrocrystal with the target value of the parameter; and
adjusting an operational parameter of at least one pixelated detector in the array of pixelated detectors until the first and second values of the parameter and the target value of the parameter are within a predetermined range of one another.

16. The method of claim 15, wherein adjusting the operational parameter comprises adjusting a biasing voltage of the at least one pixelated detector.

17. The method of claim 15, wherein the operational parameter is adjusted until the first and second values of the parameter and the target value are substantially the same.

18. The method of claim 15, wherein the parameter comprises a photopeak of the energy spectra correlated to the scintillation crystals in the first and second macrocrystals, wherein the photopeak for the first macrocrystal is a first weighted mean photopeak obtained by computing a weighted average of photopeaks in the energy spectra correlated to scintillation crystals in the first macrocrystal and the photopeak for the second macrocrystal is a second weighted mean photopeak obtained by computing a weighted average of photopeaks in the energy spectra correlated to scintillation crystals in the second macrocrystal.

19. A medical imaging system, comprising:
a photodetector, comprising:
a plurality of scintillation crystals adapted to interact with first photons to generate second photons;
an array of pixelated detectors configured to receive the second photons and generate signals having a parameter proportional to a flux of the second photons; and
processing circuitry configured to adjust at least one operational parameter of the photodetector, comprising:
a processor configured to execute one or more sets of instructions to adjust the at least one operational parameter of the photodetector; and
a memory storing the one or more sets of instructions executable by the processor to:
generate energy spectra for each scintillation crystal of the plurality of scintillation crystals based on the signals generated by the array of pixelated detectors;
group the plurality of scintillation crystals into macrocrystals based on positional relationships between each scintillation crystal and the array of pixelated detectors;
generate a photopeak for each macrocrystal, wherein each photopeak is representative of the energy spectra of the scintillation crystals within each macrocrystal;
compare the photopeak of each macrocrystal with a target photopeak; and
adjust the at least one operational parameter of at least one pixelated detector in the array of pixelated detectors until the photopeak of all of the macrocrystals and the target photopeak are within a predetermined range of one another.

20. The system of claim 19, wherein the at least one operational parameter is a biasing voltage or other gain adjustment method.

21. The system of claim 19, wherein the array of pixelated detectors are configured to generate signals having the parameter proportional to the flux of the second photons when operated above their breakdown voltages.

22. The system of claim 21, wherein the one or more sets of instructions are executable by the processor to adjust a coincidence timing resolution of the plurality of scintillation crystals by applying an additional fixed voltage above the respective breakdown voltage of each pixelated detector in the array of pixelated detectors.

23. The system of claim 19, wherein the medical imaging system is a photon emission tomography (PET) imaging system comprising a gamma camera, wherein the photodetector is one of a plurality of photodetectors of the gamma camera.

24. The system of claim 19, wherein the plurality of scintillation crystals comprise at least one element capable of undergoing radioactive decay to intrinsically emit gamma photons, and the gamma photons comprise the first photons.

25. The system of claim 19, wherein the plurality of scintillation crystals comprise cerium-doped lutetium yttrium orthosilicate (LYSO) crystals.

* * * * *